A. R. SCHOENKY.
MACHINE FOR TURNING THE LIPS OF INSOLES.
APPLICATION FILED NOV. 11, 1915.
1,220,691.
Patented Mar. 27, 1917.
2 SHEETS—SHEET 1.
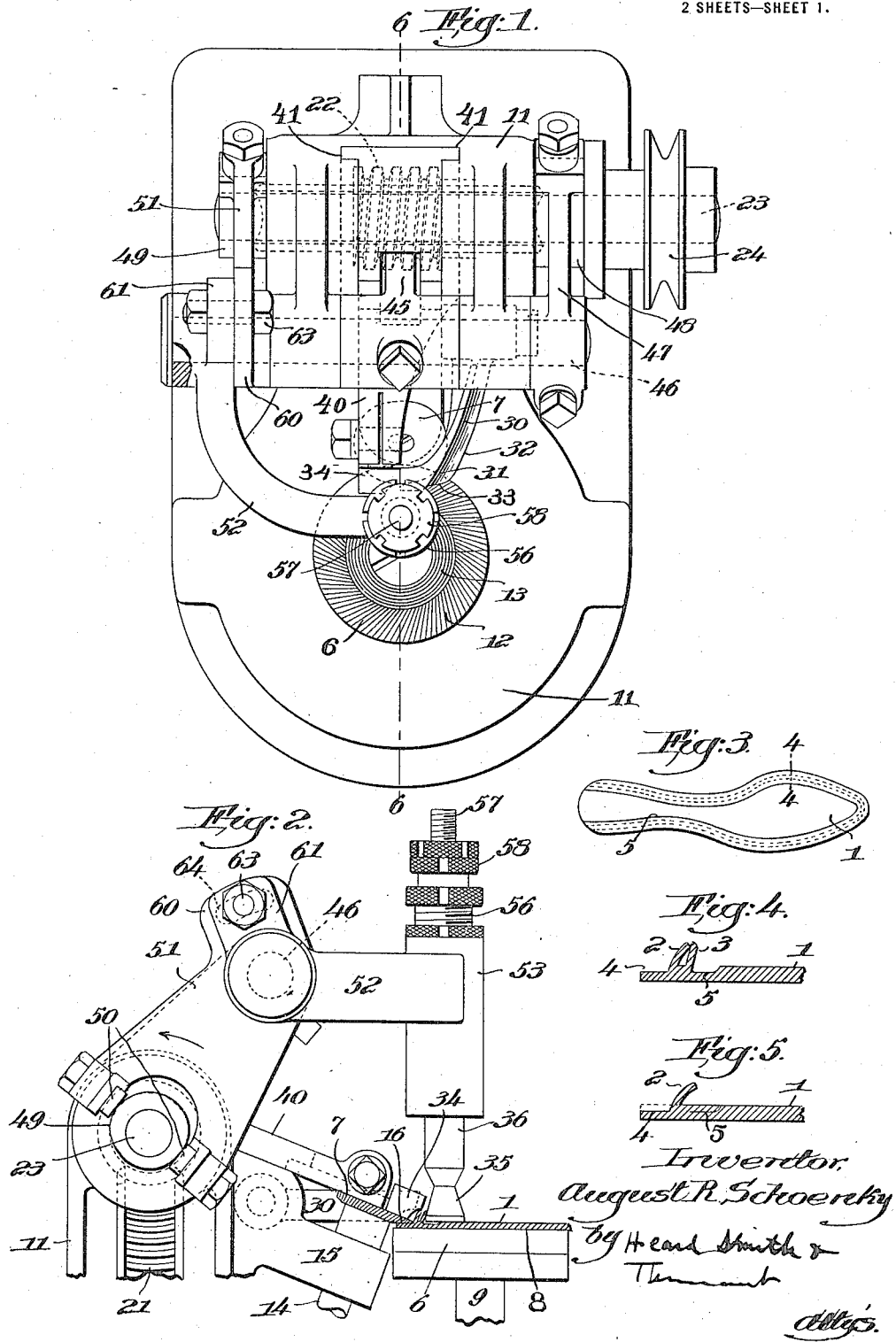

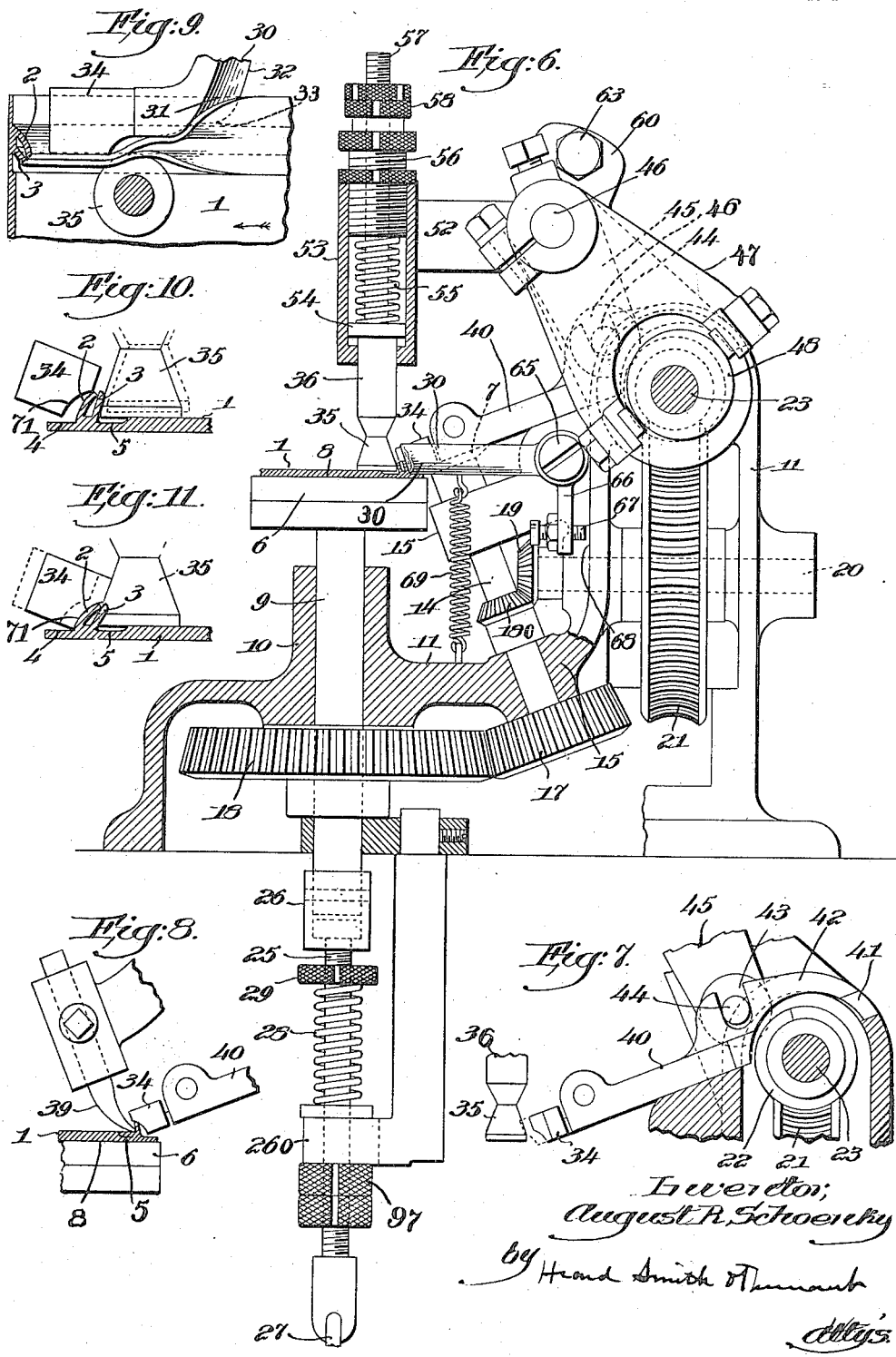

UNITED STATES PATENT OFFICE.

AUGUST R. SCHOENKY, OF SOMERVILLE, MASSACHUSETTS, ASSIGNOR TO THE REECE SHOE MACHINERY COMPANY, OF BOSTON, MASSACHUSETTS, A CORPORATION OF MAINE.

MACHINE FOR TURNING THE LIPS OF INSOLES.

1,220,691.   Specification of Letters Patent.   Patented Mar. 27, 1917.

Application filed November 11, 1915.   Serial No. 60,949.

*To all whom it may concern:*

Be it known that I, AUGUST R. SCHOENKY, a citizen of the United States, residing at Somerville, county of Middlesex, State of Masachusetts, have invented an Improvement in Machines for Turning the Lips of Insoles, of which the following description, in connection with the accompanying drawing, is a specification, like characters on the drawing representing like parts.

This invention relates to a machine for turning up the lips of insoles and it has for its object to provide a machine for this purpose which is simple in construction and rapid and effective in operation.

Insoles that are used in the manufacture of boots and shoes are commonly made by providing one or more channels at or adjacent the periphery of the insole blank and then turning up the flap or flaps caused by the channeling operation to form a lip to which the upper and welt are sewed. In some insoles the lip is formed by providing a single channel around the periphery of the insole and turning up a single flap thus formed by the channel, and in other insoles the lip is formed by making two parallel channels, one being cut from the periphery inwardly and the other being cut in the opposite direction, and then turning up the two flaps formed by these opposed channels to make a lip of double thickness. My invention is capable of use in turning up either the single or the double lip.

The device comprises feeding means for feeding the insole or work forward, a guide member adapted to enter the channel of the insole and guide said insole in its feeding movement, said guiding member acting also to partially raise the lip, and two opposed vibrating lip-turning and setting elements which act on opposite sides of the lip as it is turned and complete the turning thereof and also set the lip in its turned-up position. These vibrating lip-turning elements coöperate with the guiding member and feeding means to hold the insole in proper position as it is fed through the machine.

In order to give an understanding of my invention I have illustrated in the drawings a selected embodiment thereof which will now be described, after which the novel features will be pointed out in the appended claims.

Figure 1 is a top plan view of a machine embodying my invention;

Fig. 2 is a left-hand end view of the upper portion of the machine shown in Fig. 1;

Fig. 3 is a plan view of an insole provided with two parallel channels before the lip is turned up;

Fig. 4 is an enlarged section on the line 4—4, Fig. 3, showing the lip turned up;

Fig. 5 is a similar section showing the insole with one part of the lip only turned up;

Fig. 6 is a vertical section on the line 6—6, Fig. 1;

Fig. 7 is a sectional detail view showing the two vibrating lip-turning and setting elements;

Fig. 8 shows a modified construction adapted for use where the lip formed by a single channel only is to be turned up;

Fig. 9 is a detail view showing the operation of the lip-turning elements;

Figs. 10 and 11 are sectional views through an insole showing the way in which the vibrating lip-turning elements operate relative to each other.

Referring first to Figs. 3, 4 and 5, 1 indicates an insole which is provided at its periphery with the usual upturned lip. The lip shown in Fig. 4 is a double lip formed by turning up the two flaps 2 and 3, while the lip shown in Fig. 5 is a single lip formed by turning up the flap 2 only.

In making an insole such as shown in Fig. 4 it is customary to channel the insole from the edge inwardly, as shown at 4, and then to also channel the insole along a line back from the edge with the depth of the channel extending toward the edge, as shown at 5, and then to turn up the two flaps formed by the channels 4 and 5 to form the double lip 2, 3. Sometimes insoles are made by making the two channels 4 and 5, but by turning up the outer lip or flap 2 only, as seen in Fig. 5, and sometimes by making the outer channel 4 only and then turning up the single lip thus made. My improved machine is designed to act on an insole provided with the two channels 4 or 5 or one single channel 4 only, and to turn up into upright position the flaps formed by the channel or channels, and to set the flaps in their turned-up position, thus forming the desired up-turned lip on the insole.

The device comprises work-feeding means by which the insole is fed forward, a stationary guiding member which operates in the channel 4 and serves to guide the insole in its feeding movement, said guiding member operating also to partially turn up the flap 2, and two opposed vibrating lip-turning members acting on the opposite sides of the up-turned lip and coöperating to complete the turning of the lip and to set the turned-up lip. Where a double lip such as shown in Fig. 4 is being turned up, one of the vibrating lip-turning members acts on the flap 2, and the other acts back of or underneath the flap 3 produced by the channel 5, while if a single lip only is desired, as shown in Fig. 5, said other lip-turning member will act against the back side of the flap 2.

Any suitable work-feeding means may be employed although I prefer the construction herein illustrated because of its simplicity and the facility with which it operates. The device shown comprises two rotative work-feeding members 6 and 7 between which the edge of the insole is fed. The member 6 is a disk-like member sustained on a vertically-extending shaft 9 journaled in suitable bearings 10 in the frame 11 which supports the operative parts of the machine. The upper surface 8 of the disk-like member 6 is roughened to facilitate the feeding operation. In the particular construction shown the peripheral portion of the disk 6 is provided with the inclined ribs or corrugations 12 while near the central portion of the disk it is provided with the annular corrugations 13, this particular arrangement being found highly satisfactory in operation.

The work-feeding member 7 is also a disk-shaped member which is fixed to and rotated by a shaft 14 journaled in suitable bearings 15 carried by the frame 11. Said shaft 14 is situated at an inclination to the shaft 10 and the feeding member 7 is provided with the beveled roughened feeding face 16 which rests on the top face of the insole 1. The feeding member 7 is situated at one side of the feeding member 6 and the inclination of the shaft 14 and the bevel of the face 16 are such that the portion thereof that overlies the member 6 and contacts with the upper face of the insole 1 is parallel to the face 8 thereof, as clearly seen in Figs. 2 and 6. When the insole is in position to be fed, it rests on the face 8 of the member 6 and the beveled roughened face 16 of the member 7 rests on the top face of the insole at the periphery thereof, the edge of the insole thus being held between the two feeding members. The two shafts 9 and 14 are geared together so that the portions of the feeding members between which the work is fed rotate in unison and at substantially the same surface speed. This is herein accomplished by providing the shaft 14 with a bevel gear 17 which meshes with a bevel gear 18 on the shaft 9, said gears being properly proportioned with relation to the relative size of the feeding members 6 and 7 to give the required relative speed of rotation between the feeding members. The shafts 9 and 14 which are thus geared together may be driven in any suitable way. In the construction shown, the shaft 14 is provided with a bevel gear 180 which meshes with and is driven by a bevel gear 19 on a shaft 20 journaled in the frame 11, said shaft having a worm-gear 21 thereon which meshes with and is driven by a worm 22 on a driving shaft 23 also journaled in suitable bearings in the frame. Said driving shaft is driven from any suitable source of power by any appropriate means. I have herein shown a driving pulley 24 fast on the shaft 23, which pulley will be belted to a power shaft. I have provided means for yieldingly sustaining the under feeding member 6 so that the insole will be yieldingly held between the feeding members and also means whereby the under feeding member may be depressed and separated from the member 7 to permit an insole to be introduced between the feeding members. For this purpose the shaft 9 is constructed to be moved longitudinally in its bearing 10 and the gear 18 is splined to the shaft so as to maintain operative engagement therewith at all times. The shaft 9 is shown as having a member 25 swiveled to the lower end thereof by the swivel coupling 26, said member 25 being slidably mounted in a bracket 260 depending from the frame 11 and having a link 27 connected thereto which leads to a suitable treadle. 28 is a spring which encircles the connection 25 and bears at one end against the bracket 260 and at the other end against a collar 29 fast on the connection 25. The spring 28 thus yieldingly holds the feeding member 6 in its elevated position, but by depressing the treadle, the shaft 9 and member 6 can be lowered against the action of the spring 28. The swivel connection 26 permits the shaft 9 to rotate freely relative to the connection 25 while at the same time maintaining operative engagement between these parts. The upward movement of the connection 26 is limited by adjustable stop nuts 97.

As stated above, the lip-turning elements of my improved machine comprise a guide member which enters the channel and acts to guide the insole in its feeding movement and also acts to partially turn up the flap 2, and two opposed vibrating lip-turning elements that act on opposite sides of the lip as it is turned. The guiding lip-turning element is shown at 30 and it is in the form of an arm having an inclined lip-turning face 31 terminating in a lower edge 32. This member 30 is adapted to enter the channel 4 as the insole is fed from the right to the left in Fig. 1 and to partially turn up the flap 2, the bottom of the member 32 resting on the bottom of the channel 4 and the inclined face 31 acting as the insole is fed forward to turn the flap 2 upwardly, as shown in Fig. 9. The portion 33 of the member 30 acts as a guide and coöperates with the bottom of the channel 4 and the partially-upturned flap 2 to guide the insole in its feeding movement.

The two vibrating lip-turning elements are shown at 34 and 35, respectively. The element 34 is a reciprocating element which reciprocates in a plane inclined slightly to the insole 1 and which is situated at the end of the guiding member 30 so that as the partially-turned lip 2 passes off from the guiding member 30 it is given repeated blows by the reciprocating lip-turning element 34 thereby to complete the turning-up of the lip and to set the lip in its turned-up position. The other vibrating lip-turning element 35 will preferably be in the form of a tapered roll rotatably mounted on the lower end of a stem or spindle 36 which is given a lateral vibrating movement in a direction transverse to the lip, this construction being especially practical where the double lip shown in Fig. 4 is to be turned up. The manner in which the three lip-turning elements operate is shown in Figs. 9, 10 and 11.

As the insole is fed forward, the guiding member 30 enters the channel 4 and partially turns up the flap 2, and as the flap 2 leaves the guiding member 4 it is acted upon by the lip-turning element 34, as above set forth. The lip-turning element 35 enters the channel 5 and acts on the flap 3 to turn the latter up, said member 35 rolling along the inner face of the flap 3 and turning it up into desired position. This lip-turning element 35 acts not only to roll up the flap 3 and to beat and thereby set the flap in its turned-up position, but it also acts against the lip 3 and in the channel 5 to hold the insole firmly against the guiding member 30 while the lip-turning element 34 is moving forwardly. The relative timing of the vibrating movements of the two lip-turning elements 34 and 35 is seen in Figs. 9 to 11. The element 35 first moves from the dotted to the full line position Fig. 10 with a quick movement, thereby giving the flap 3 a hammer-like blow and setting the flap. During this time the member 34 is in its retracted position, as shown in full lines, Fig. 10. The member 34 then moves forwardly into the position shown in Fig. 11, thereby giving the flap 2 a hammer-like blow, and during this time the member 35 remains in the full line position Figs. 10 and 11 and operates to hold the insole firmly against the guiding member 30 and to prevent said insole from being moved backwardly by the engagement of the lip-turning element 34 with the flap 2. The two elements 34, 35 are then retracted, and this cycle of operations is again repeated. The two elements vibrate at the same rate but their movements are at different times in each cycle of operation. The element 35 first moves into operative position, then dwells in this position while the element 34 moves forward, the element 35 thus operating not only as a lip-turning element but as an insole-holding element to retain the insole in position while the element 34 is operated. The elements 34 and 35 are designed to be vibrated very rapidly as the insole is fed forward so that both of the flaps 2 and 3 are given a rapid succession of hammer-like blows which sets them in their upturned position.

If a lip on the insole is to be made from the flap formed by a single channel only, as seen in Fig. 5, I may use an element of the type shown in Fig. 8 in place of the tapered roll 35 shown in Fig. 2. In the device shown in Fig. 8, said lip-turning and insole-holding element is in the form of a pointed finger 39 which is designed to operate against the inner side of the flap 2. The pointed or tapered construction of the finger 39 obviates any danger that said finger will enter the channel if the insole is provided with one.

The lip-turning element 30 is shown as pivotally secured to the frame 11 at 65, and it has integral therewith a depending arm 66 carrying a stop screw 67 which coöperates with the portion 68 of the frame to limit the downward swinging movement thereof. This member 30 is yieldingly held against the work by means of a spring 69.

Any suitable means for giving the elements 34 and 35 their rapid vibrating movement in proper timed relation may be employed. In the construction herein shown the element 34 is carried by a slide 40 which reciprocates in suitable ways 41 formed in the frame 11. This slide is provided with the head portion 42 in which is formed a slot 43 that receives a pin 44 carried by the lower end of an arm 45 that is fast on a shaft 46 supported in suitable bearings in the frame 11. The shaft 46 has rigid therewith an arm 47, the lower end of which is forked and straddles and engages a cam 48 fast on the shaft 23 so that the rotation of the shaft will oscillate the shaft 46 and thereby reciprocate the slide 40. The lip-turning element 35 also derives its vibratory movement from the shaft 23, and for this purpose I have provided said shaft with a cam member 49 which operates between two followers 50 carried by an arm 51 that is pivotally hung on the shaft 46. The arm 51 has rigid therewith a curved arm 52 carrying at its end a head 53 in which the stem 36 is mounted, the construction being such that the oscillation of the arm 51, 52 due to the cam 49 will cause the element 35 to swing toward and from the element 34. The stem 36 is adjustably and yieldingly mounted in the head 53 so as to permit the element 34 to be adjusted for different thicknesses of work and to readily follow the insole if the latter varies in thickness at all. The head 53 has a bushing 56 screw-threaded into the upper end thereof through which the upper end 57 of the stem 36 extends. Said stem is also provided with a collar 54 between which and the bushing 56 is a spring 55 that tends to hold the stem 36 yieldingly in its lowest position. 58 is a stop nut screwed onto the upper end 57 of the stem 36 and which limits the downward movement of the stem by its engagement with the bushing 56. By this means the normal or lowest position of the stem 36 and member 35 can be readily adjusted and also the tension of the spring 55 can be adjusted to suit the requirements of use.

The arm 52 is shown as adjustably connected to the arm 51 so as to provide for any necessary vertical adjustment of the head 53. This is herein arranged for by forming the arm 51 with an extension 60 which overlies an extension 61 integral with the arm 52, the two extensions being rigidly bolted together by a clamping bolt 63 which operates in a slot 64 formed in one of the extensions.

The particular shape of the vibratory elements 34 and 35 will depend something on the shape of the lip which it is desired to form. In making some insoles it is customary to bend the lip in toward the center somewhat, as shown in Fig. 4, so that the inner face of the lip will make an acute angle with the body of the insole, while the outer face of the lip makes an obtuse angle therewith. The vibratory elements 34, 35 are constructed to produce a lip of this shape, the element 35 being tapered and larger at the bottom while the element 34 is provided with the curved lip-forming face 71 which engages the outer face of the lip and gives it the desired shape. In the construction shown the two elements 34, 35 are not exactly opposite each other, the element 35 being situated slightly in advance of the element 34. This arrangement is adopted because the element 35 constitutes not only a lip-setting element but also an insole-holding element, and in performing the latter function, it coöperates with the guiding element 30. This coöperation is better effected if the element 35 is situated in about the relative position shown in Fig. 9. With this construction the upturned lips 2 and 3 will enter the space between the end of the element 30 and the element 35, and then will be curved around the element 35 slightly and between the latter and the element 34, as shown best in Fig. 9. In my improved machine, the element 34 may be considered as a hammer element and the element 35 as an anvil element since the element 35 is first moved against the inside of the lip and then remains stationary while the element 34 gives its hammer-like blow.

A machine embodying my invention is capable of high speed operation and has the advantage that very little guiding of the insole is necessary as the channels and upturned lip serve largely to guide the insole in its movement.

While I have illustrated herein a selected embodiment of my invention, I do not wish to be limited to the constructional features shown.

I claim:

1. In a machine for turning up the lips of insoles, the combination with work-feeding means, of a lip-turning element adapted to enter the channel of an insole and turn up the lip as the insole is fed, a vibrating element to give the turned-up lip a rapid succession of blows, a second element to engage the inner side of the lip, and means to give said second element a vibrating movement toward and from the lip and transversely thereof thereby to prevent the insole from being displaced laterally by the blows of the first-named vibrating element.

2. In a machine of the class described, the combination with work-feeding means, of a combined guide and lip-turning element adapted to enter the channel of an insole and turn up a lip therefrom as the work is fed and also operating to guide the insole during its feeding movement, a vibrating lip-setting element to give the turned-up lip a rapid succession of lip-setting blows, a laterally vibrating device situated on the inside of the lip, and means to vibrate said device in a direction transverse to the lip to cause it to engage the inner face thereof and hold the insole in proper relation to the combined guide and lip-turning element as the work is fed.

3. In a machine of the class described, the combination with work-feeding means, of a combined guide and lip-turning element adapted to enter the channel of an insole and turn up the lip therefrom as the work is fed and also operating to guide the insole during its feeding movement, a vibrating lip-setting element to give the turned-up lip a rapid succession of lip-setting blows, a laterally-vibrating device adapted to act on the inside of the lip, and means to vibrate said device in timed relation with the movements of the lip-setting element to cause said device to engage intermittently the inner face of the lip and hold the insole in proper relation to the combined guide and lip-turning element as the work is fed.

4. In a machine of the class described, the combination with work-feeding means, of a combined guide and lip-turning element adapted to enter the channel of an insole and turn up a lip therefrom as the work is fed and also operating to guide the insole during its feeding movement, a vibrating lip setting element to give the turned-up lip a rapid succession of lip-setting blows, a laterally-vibrating element, and means to vibrate said element in timed relation with the movements of the lip-setting element to cause said laterally-vibrating element to engage intermittently the inner face of the lip at a point opposite the lip-setting element and hold the insole in proper relation to the combined guide and lip-turning element as the work is fed.

5. In a machine of the class described, the combination with work-feeding means, of a combined guide and lip-turning element adapted to enter the channel of an insole and turn up a lip therefrom as the work is fed and also operating to guide the insole during its feeding movement, a vibrating lip-setting element to give the turned-up lip a rapid succession of lip-setting blows, and a vibratory device to engage intermittently the inner face of the lip and hold the insole in proper relation to the combined guide and lip-turning element as the work is fed, and means to vibrate the lip-setting element and said device in timed relation.

6. In a machine of the class described, the combination with work-feeding means, of a combined guide and lip-turning element adapted to enter the channel of an insole and turn up a lip therefrom as the work is fed and also operating to guide the insole during its feeding movement, a vibrating lip-setting element to give the turned-up lip a rapid succession of lip-setting blows, a vibratory device to engage the inner face of the lip and hold the insole in proper relation to the combined guide and lip-turning element as the work is fed, and means to give said vibratory device its lip-engaging movements just prior to those of the lip-setting element but in timed relation therewith.

7. In a device of the class described, the combination with work-feeding means, of a combined guide and lip-turning element adapted to enter the channel of an insole and turn up a lip as the work is fed, a vibrating lip-setting element to give the turned-up lip a series of lip-setting blows, a vibrating member situated on the inside of the lip and coöperating with the lip-setting element to form the lip, and means for giving the latter element its lip-engaging movement just prior to that of the former element and for holding said latter element in engagement with the lip while the former element strikes its blow.

8. In a device of the class described, the combination with work-feeding means for feeding a channeled insole, of two opposed vibratory lip-turning and setting elements operating on opposite sides of the channeled portion of the insole to turn up a lip therefrom as the insole is fed forward, and means to give said elements their lip-turning movements successively.

9. In a device of the class described, the combination with work-feeding means, of means to turn up a lip from a channeled insole, and two vibratory elements operating on opposite sides of the lip, and means to cause said elements alternately to give the lip hammer-like blows.

10. In a device of the class described, the combination with work-feeding means, of means to turn up a lip from a channeled insole, two vibratory elements operating on opposite sides of the lip to give the latter hammer-like blows, and means for actuating said devices to cause one device to engage the lip before the other and maintain its engagement therewith while the other device is striking its blow.

11. In a device of the class described, the combination with work-feeding means, of two vibratory elements adapted to operate on opposite sides of a lip turned up from a channeled insole, and means to cause said elements alternately to give the lip hammer-like blows.

12. In a device of the class described, the combination with work-feeding means, of two vibratory elements adapted to operate on opposite sides of a lip turned up from a channeled insole, and means for actuating said elements to cause one element to engage the lip before the other and maintain its engagement therewith while the other element is striking its blow.

13. In a device of the class described, the combination with work-feeding means, of two vibratory elements adapted to operate on opposite sides of a lip turned up from a channeled insole, and means for actuating said elements to cause the element situated on the inside of the lip to engage the lip before the other and maintain its engagement therewith while the other element is delivering a hammer-like blow to the outside of the lip.

14. In a device of the class described, the combination with work-feeding means, of a yieldingly-mounted lip-turning element adapted to enter the channel of an insole as it is fed by said work-feeding means and turn up a lip therefrom, a vibrating lip-setting element situated adjacent the delivery end of said lip-turning element and adapted to give the lip a rapid succession of blows, and a yieldingly-sustained laterally vibrating element to engage the inside of the lip and coöperating with the first-named vibratory element to set the lip.

15. In a device of the class described, the combination with means to turn up a lip from a channeled insole, of two vibratory elements adapted to operate on opposite sides of said lip, and means to cause said elements to vibrate toward and from the lip at different times.

16. In a device of the class described, the combination with means to feed a channeled insole, of two vibratory elements operating on opposite sides of a lip turned up from said insole, and means to vibrate said elements toward and from the lip, said means operating to cause one element to engage the lip with a movement laterally thereto and to maintain its engagement with the lip for an interval and to cause the other element to strike the lip with a hammer-like blow while the first-named element is in engagement therewith.

In testimony whereof, I have signed my name to this specification.

AUGUST R. SCHOENKY.

Copies of this patent may be obtained for five cents each, by addressing the "Commissioner of Patents, Washington, D. C."